WHERE  $\Delta Y$ = NORTH-SOUTH DISTANCE TO TARGET $\Delta X$ = EAST-WEST DISTANCE TO TARGET $\dot{Y}$ = NORTH-SOUTH TARGET VELOCITY $\dot{X}$ = EAST-WEST TARGET VELOCITY $V_i$ = INTERCEPTOR VELOCITY $t$ = TIME TO INTERCEPT $\hat{\beta}$ = HEADING ANGLE

EDGAR G. SMITH
INVENTOR.

EDGAR J. SMITH
INVENTOR.

BY S. A. Giarratana
Francis L. Maselle
ATTORNEYS

United States Patent Office 3,360,637
Patented Dec. 26, 1967

3,360,637
HEADING ANGLE COMPUTER
Edgar J. Smith, Verona, N.J., assignor to General Precision Inc., Little Falls, N.J., a corporation of Delaware
Filed July 3, 1963, Ser. No. 292,525
6 Claims. (Cl. 235—150.26)

This invention relates to a system for computing the heading angle for a missile or other moving vehicle to intercept a target in the minimum time.

In the solving of the problem of computing the heading angle, information as to the position of the target, the speed of the target, the direction the target is moving, and the interceptor velocity is readily obtainable. In addition to the heading angle for the interceptor, the time remaining before interception is not known. From the readily available information, two equations can be written in terms of the unknown heading angle and the unknown time remaining before interception. The computer of the present invention simultaneously solves these equations for the unknown heading angle.

Accordingly, a principal object of the present invention is to provide a system to compute the heading angle for an interceptor to follow to intercept a moving target.

Another object of the present invention is to make possible interception in a minimum time.

A further object of this invention is to provide a system which will compute the heading angle which an interceptor must follow to intercept a target in the minimum time.

These objects are accomplished in accordance with the present invention by means of a resolver servo system adapted to receive signals representing target velocity, target position, and interceptor speed. The system actually comprises two interdependent servos, one, called the beta servo, driving an output shaft to the heading angle and the other one, called the time servo, driving the movable arm of a potentiometer to a position representing the remaining time before interception. The output from the beta servo provides part of the input to the time servo and the output from the time servo provides part of the input signal to the beta servo. Both servos operate simultaneously to compute the correct heading angle and the time before interception.

The principles of the invention are applicable to the solution of other practical problems involving simultaneous equations. Accordingly a still further object of the present invention is to provide an improved computer for solving simultaneous equations.

Further objects and advantages of the present invention will become readily apparent as the following detailed description of the invention unfolds and when taken in conjunction with the drawings, wherein.

Figure 1:
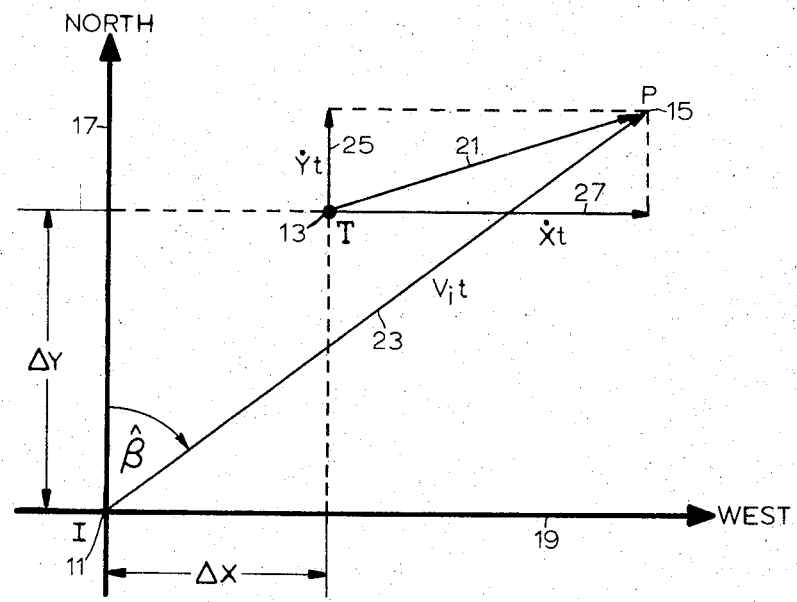
FIG. 1 illustrates the problem which is solved by the system of the present invention.

The diagram shown in FIG. 1 illustrates the problem, which the system of the present invention solves. The problem is to compute the proper heading angle to be followed by an interceptor to intercept a moving target in the minimum time. In FIG. 1 the reference number 11 designates the position of the interceptor, the reference number 13 designates the position of the target, and the reference number 15 designates the point at which the interceptor will intercept the target. An arrow 17 indicates the direction North from the position 11 and an arrow 19 indicates the direction West from the position 11. A vector 21 is drawn from the position 13 to the position 15 and constitutes the path of the target during the interval remaining before interception. A vector 23 is drawn from the position 11 to the interception point 15 and constitutes the path of the interceptor during the interval remaining before the target interception. The angle $\beta$ between the vector 23 and North is the unknown heading angle which the system of the present invention determines. The north-south distance between the target position 13 and the interceptor position 11 is $\Delta y$ and the east-west distance between the target position 13 and the interceptor position 11 is $\Delta x$. The north-south velocity of the target is $\dot{y}$ and the east-west velocity of the target is $\dot{x}$. The interceptor velocity is $V_i$, and $t$ is the time interval remaining before the target interception. The vector 25 is the north-south component of the vector 21 and will be equal to $\dot{y}t$. The vector 27 is the east-west component of the vector 21 and will be equal to $\dot{x}t$. The vector 23 will be equal to $V_i t$. The unknown heading angle $\beta$, together with the unknown time $t$, can be found from the simultaneous solution of the following two equations:

(1) $(\Delta x + \dot{x}t) \sin \beta + (\Delta y + \dot{y}t) \cos \beta = V_i t$
(2) $-(\Delta x + \dot{x}t) \cos \beta + (\Delta y + \dot{y}t) \sin \beta = 0$ In these equations the quantities $\Delta x$, $\Delta y$, $V_i$, $\dot{x}$, and $\dot{y}$ are known and are supplied to the system of the present invention in the form of analog electrical signals. Only $\beta$ and $t$ are unknown. Since there are two equations as well as two unknowns, $\beta$ and $t$, $\beta$ and $t$ can be determined by the simultaneous solution of the two equations. The truth of the Equations 1 and 2 can be proved as follows. Since the vector 23 is $V_i t$, the north-south component of the vector $V_i t$ is $V_i t \cos \beta$ and the east-west component of the vector 23 is $V_i t \sin \beta$. Thus the north-south distance between the interception point 15 and the interceptor position 11 is equal to $V_i t \cos \beta$ and the east-west distance between the interception point 15 and the interceptor position 11 is equal to $V_i t \sin \beta$. The north-south distance between the point 15 and the position 11 is also equal to $\Delta y + \dot{y}t$ and the east-west distance between the interception point 15 and the interceptor position 11 is also equal to $\Delta x + \dot{x}t$. Therefore the following equations are true:

(3) $V_i t \cos \beta = \dot{y}t + \Delta y$
(4) $V_i t \sin \beta = \dot{x}t + \Delta x$ If both sides of Equation 3 are multiplied by $\cos \beta$ and both sides of Equation 4 are multiplied by $\sin \beta$ and the two resulting equations are added together then the following equation results:

(5) $V_i t (\sin^2 \beta + \cos^2 \beta) = (\Delta x + \dot{x}t) \sin \beta + (\Delta y + \dot{y}t) \cos \beta$ But since $\sin^2 \beta + \cos^2 \beta = 1$, Equation 5 can be seen to be the same as Equation 1. If both sides of Equation 3 are multiplied by $\sin \beta$ and both sides of Equation 4 are multiplied by $\cos \beta$ and the resulting two equations are subtracted, the resulting equation will be Equation 2. Thus Equations 1 and 2 are correct expressions.

Figure 2:
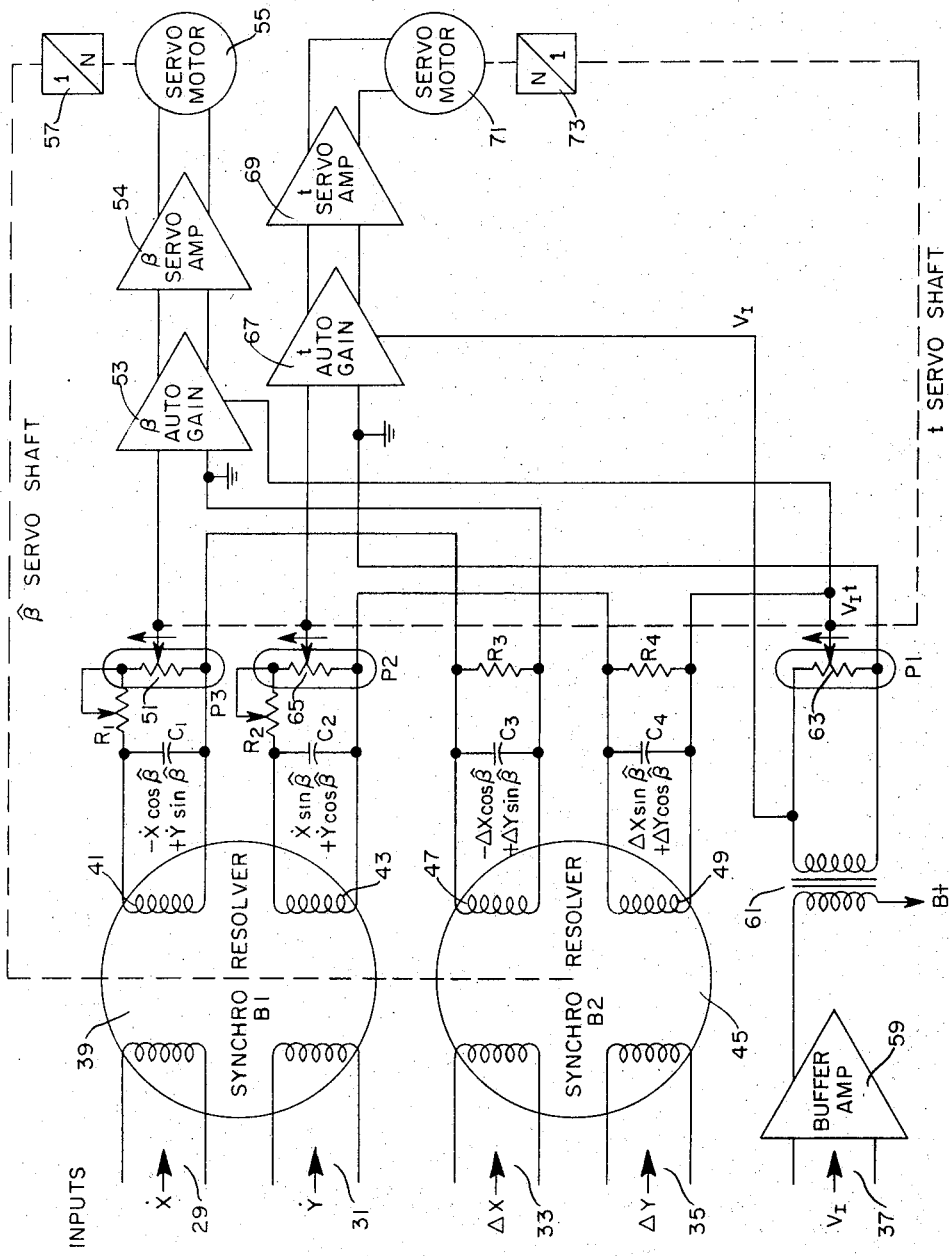
FIG. 2 is a schematic circuit diagram of the system of the present invention.

As shown in FIG. 2, there are five inputs to the system. A signal representing $\dot{x}$ is applied at input 29, a signal representing $\dot{y}$ is applied at input 31, a signal representing $\Delta x$ is applied at input 33, a signal representing $\Delta y$ is applied at input 35, and a signal representing $V_i$ is applied at input 37. The signals representing $\dot{x}$ and $\dot{y}$ are applied to a resolver 39, which produces at an output 41 a signal representing $\dot{y} \sin \alpha - \dot{x} \cos \alpha$ and a signal at an output 43 representing $\dot{x} \sin \alpha + \dot{y} \cos \alpha$, in which $\alpha$ is the input shaft angle of the resolver 39. The signals applied at inputs 33 and 35 representing $\Delta x$ and $\Delta y$, are applied to a resolver 45, which has its input shaft coupled to the input shaft of the resolver 39 and aligned therewith so that the input shafts of both of the resolvers will be at the same angle $\alpha$. The resolver 45, in response to the applied signals produces at an output 47 a signal representing $\Delta y \sin \alpha - \Delta x \cos \alpha$ and produces at an output 49 a signal representing $\Delta y \cos \alpha + \Delta x \sin \alpha$. Capacitors $C_1$, $C_2$, $C_3$ and $C_4$, shunting the resolver outputs 41, 43, 47 and 49, respectively, serve, in conjunction with the resistive elements in parallel therewith, to remove the characteristic phase shift of the resolvers. Variable resistors $R_1$ and $R_2$ are trimmers for scale factor adjustment of resolver 39 and fixed resistors $R_3$ and $R_4$ provide symmetrical loading for the outputs of resolver 45.

The signal produced at output 41 of the resolver 39 is applied across the resistance of a potentiometer 51, the movable contact of which is positioned by means described below to represent the unknown value $t$ so that the output signal from the potentiometer 51 will represent $\dot{y}t \sin \alpha - \dot{x}t \cos \alpha$. The output signal produced by the potentiometer 51 and the signal produced at the output 47 of the resolver 45 are connected in series and applied across the input of an amplifier 53. As pointed out above, the signal produced at the output 47 by the resolver 45 is $\Delta y \sin \alpha - \Delta x \cos \alpha$ so that the signal applied across the input of the amplifier 53 will equal $\dot{y}t \sin \alpha - \dot{x}t \cos \alpha + \Delta y \sin \alpha - \Delta x \cos \alpha$. This signal is is amplified by the amplifier 53 and applied to the input of a servo amplifier 54, which amplifies the signal and applies it to a servo motor 55. The output shaft of the servo motor 55 through a gear train 57 drives the input shafts of the resolvers 39 and 45. The servo motor will drive the input shafts of the resolvers 39 and 45 until the signal applied across the input of the amplifier 53 is zero. If the movable arm of the potentiometer 51 is properly positioned at $t$, the quantity $$\dot{y}t \sin \alpha - \dot{x}t \cos \alpha + \Delta y \sin \alpha - \Delta x \cos \alpha$$

will equal zero when the signal across the input of the amplifier 53 is zero. From Equation 2 it will be seen that when the $\dot{y}t \sin \alpha - \dot{x}t \cos \alpha + \Delta y \sin \alpha - \Delta x \cos \alpha$ is equal to zero, $\alpha$ will equal $\beta$. Thus if the movable arm of the potentiometer 51 is positioned at $t$, the input shafts of the resolvers 39 and 45 will be driven to the angle $\beta$.

The signal representing $V_i$ applied to the input 37 is amplified by a buffer amplifier 59 and then applied to the primary winding of a transformer 61, the secondary winding of which is connected across the resistance of a potentiometer 63 so that the amplified signal $V_i$ is applied across the resistance of the potentiometer 63. The position of the movable arm of the potentiometer 63 is designated by $p$ so that the output signal produced on the movable arm of the potentiometer 63 will be $V_i p$. When the input shafts of the resolvers 39 and 45 are properly positioned at the angle $\beta$, the signal produced at output 43 of the resolver 39 will represent $$\dot{x} \sin \beta + \dot{y} \cos \beta$$

and the signal produced at output 49 of the resolver 45 will represent $\Delta x \sin \beta + \Delta y \cos \beta$. The signal produced at output 43 of the resolver 39 is applied across the resistance of a potentiometer 65, the movable arm of which is coupled to and aligned with the movable arm of the potentiometer 63 so that the movable arms of both potentiometers will be at the same position $p$. Therefore, when the input shafts of the resolvers 39 and 45 are positioned at the angle $\beta$, the potentiometer 65 will produce an output signal representing $\dot{x}p \sin \beta + \dot{y}p \cos \beta$. The output signal of the potentiometer 65, the signal produced at output 49 of the resolver 45, and the output signal of the potentiometer 63 are connected in series across the input of an amplifier 67 in such a manner to add the former two signals together and subtract the latter signal from the resulting sum. Therefore when the input shaft angle of the resolvers 39 and 45 is $\beta$, the amplifier 67 will have applied across its input a signal representing $\dot{x}p \sin \beta + \dot{y}p \cos \beta + \Delta x \sin \beta + \Delta y \cos \beta - V_i p$. The amplifier 67 will amplify the applied signal and apply it to the input of a servo amplifier 69 which will further amplify the signal and apply it to a servo motor 71. The servo motor 71 drives the movable arms of the potentiometers 63 and 65 through a gear train 73. The servo motor 71 will drive the movable arms of the potentiometers 63 and 65 until the signal applied across the input of the amplifier 67 is zero. If the input shaft angle of the resolvers 39 and 45 is $\beta$, the quantity $$\dot{x}p \sin \beta + \dot{y}p \cos \beta + \Delta x \sin \beta + \Delta y \cos \beta - V_i p$$

will equal zero when the signal applied across the input of the amplifier 67 is zero. From Equation 1 it will be seen that when the quantity $$\dot{x}p \sin \beta + \dot{y}p \cos \beta + \Delta x \sin \beta + \Delta y \cos \beta - V_i p$$

is zero, $p$ will equal $t$. Thus the servo motor 71 will position the movable arms of the potentiometers 63 and 65 at a position representing the quantity $t$ if the input shafts of the resolvers 39 and 45 are positioned at the angle $\beta$. The movable arm of the potentiometer 51 is also coupled to the movable arms of the potentiometers 65 and 63 to be at the same position $p$. The servo motors 55 and 71 operate simultaneously to drive the input shafts of the resolvers 39 and 45 and the movable arms of the potentiometers 63, 65 and 51 until the signals applied across the inputs of the amplifiers 53 and 67 are both driven to zero. It will be seen from Equations 1 and 2 that when the signals applied across both the inputs of the amplifiers 53 and 67 are driven to zero, the movable arms of the potentiometers 63, 65 and 51 will be at a position representing $t$ and the input shafts of the resolvers 39 and 45 will be at the angular position $\beta$. In this manner the servo system shown in FIG. 2 solves the simultaneous Equations 1 and 2 for both the quantities $\beta$ and $t$.

The system shown in FIG. 1 is essentially two interdependent servo mechanisms operating simultaneously, one positioning the input shafts of the resolvers 39 and 45 at the angle $\beta$ and the other positioning the movable arms of the potentiometers 63, 65 and 51 to represent $t$. The servo mechanism positioning the input shafts of the resolvers 39 and 45 is referred to as the beta servo and the servo mechanism positioning the movable arms of the potentiometers 63, 65 and 51 is referred to as the time servo. The error signal for the time and beta servos can be represented as follows:

(6) $\quad e_t = (\Delta x + \dot{x}t) \sin \beta + (\Delta y + \dot{y}t) \cos \beta - V_i t$ (7) $\quad e_\beta = -(\Delta x + \dot{x}t) \cos \beta + (\Delta y + \dot{y}t) \sin \beta$ In these equations $e_t$ is the time servo error signal and $e_\beta$ is the beta servo error signal. The gain of a servo mechanism is defined as the ratio rate of change of the error signal to the rate of change of the servo output. Hence the gain of the time servo can be represented as follows:

(8) $\quad \dfrac{de_t}{dt} = \dot{x} \sin \beta + \dot{y} \cos \beta - V_i$ and the gain of the beta servo can be represented as follows:

(9) $\quad \dfrac{de_\beta}{d\beta} = (\Delta x + \dot{x}t) \sin \beta + (\Delta y + \dot{y}t) \cos \beta$ Thus it will be seen that the gain of neither the $\beta$ servo nor the time servo is constant. In order to maintain a constant accuracy in the system, it is desirable to make the gain for both the $\beta$ and time servos constant. This is accomplished in the system of the present invention by means of the amplifiers 53 and 67, which are variable gain amplifiers. By making the gain of the amplifier 53 proportional to $$\dfrac{1}{de_\beta/d\beta}$$

and by making the gain of the amplifier 67 proportional to $$\frac{1}{de_t/dt}$$

the gain of the $\beta$ and time servos is made constant. From Equations 9 and 1 it can be seen that $de_\beta/d\beta$ is equal to $V_i t$. Accordingly, the output signal from the potentiometer 63 representing $V_i t$ is fed to the amplifier 53 and the gain of the amplifier 53 is made to vary inversely with this applied signal. Hence the gain of the amplifier 53 will be proportional to $$\frac{1}{de_\beta/d\beta}$$

and the gain of the beta servo will be constant. In the practical use of the system, $V_1$ will be much greater than the quantities $\dot{x}$ and $\dot{y}$. Accordingly the first two terms of the Equation 8 can be discarded and $de_t/dt$ is found to be approximately proportional to $V_1$. Accordingly the output signal from the transformer 61 which represents $V_1$ is fed to the variable gain amplifier 67 and the gain of the amplifier 67 is made to vary inversely in accordance with this applied signal. Hence the gain of the amplifier 67 will be proportional to $$\frac{1}{de_t/dt}$$

and the gain of the time servo will be maintained constant.

In the use of the system of the present invention it is contemplated that the system will continuously compute the value of $\beta$ as the interceptor follows the computed heading and approaches the target so that if and when the input values $\dot{x}$, $\dot{y}$ or $V_1$ changes the system will immediately compute the new heading angle resulting from the change so that the interceptor can change course to follow the new heading angle. For this reason the signals representing the input values $\dot{x}$, $\dot{y}$, $\Delta x$, $\Delta y$, and $V_1$ are maintained current to continuously correctly represent these input values.

There are two methematical solutions for each of the two unknowns in two simultaneous equations. Accordingly there will always be two values of $\beta$ and $t$ which will satisfy Equations 1 and 2. It is desired that the system solve for only that set of values which will provide interception in the minimum positive time $t$. The servo mechanism is designed so as to solve for this proper result as explained below. Because $\beta$ is an angle, its value is not bounded and the beta servo can drive the input shaft of the resolvers 39 and 45 to the correct angle even if in so driving the input shafts of the resolvers 39 and 45 the input shaft position passes through 360° or 0°. On the other hand, the value of $t$ is limited by the scale of the potentiometer 63 between 0 and $t$ max., which is the maximum $t$ that can be represented by the servo 63. The time servo cannot drive the movable arm of the potentiometer 63 through 0 or $t$ max. Because $\beta$ is unbounded, the system will always solve for a value of $\beta$ that satisfies Equation 1. There are two solutions of $\beta$ that satisfy Equation 1, 180° apart, but only the correct one of these solutions will have a negative slope at the null point; that is for only the correct one of these solutions will $de_\beta/d\beta$ be negative. Accordingly, the $\beta$ servo is made to drive the input shafts of the resolvers 39 and 45 in a direction to increase the shaft angle position in response to a positive error signal and in a direction to decrease the shaft angle position in response to a negative error signal so that the $\beta$ servo will always drive the input shafts of the resolvers 39 and 45 to the correct value of $\beta$ where the slope of the solution is negative at the null point.

The quantities $\cos \beta$ and $\sin \beta$ can be represented as follows:

(10) $$\cos \beta = \frac{\Delta y + \dot{y} t}{V_i t}$$

(11) $$\sin \beta = \frac{\Delta x + \dot{x} t}{V_i t}$$

Substituting these values into Equation 6 and setting $e_t$ equal to 0, the following equation results:

(12) $$0 = (\Delta x + \dot{x} t)^2 + (\Delta y + \dot{y} t)^2 - (V_i t)^2$$

This equation can be rewritten as follows:

(13) $$(-V_i^2 + \dot{x}^2 + \dot{y}^2) t^2 + (2 \Delta x \dot{x} + 2 \Delta y \dot{y}) t + (\Delta x^2 + \Delta y^2) = 0$$

The quantities A, B and C are defined as follows:

(14) $$A = -V_i^2 + \dot{x}^2 + \dot{y}^2$$
(15) $$B = 2 \Delta x \dot{x} + 2 \Delta y \dot{y}$$
(16) $$C = \Delta x^2 + \Delta y^2$$

Substituting A, B, and C into Equation 13 the following equation results:

(17) $$At^2 + Bt + C = 0$$

Solving Equation 17 for $t$, the following equation results:

(18) $$t = \frac{-B \pm \sqrt{B^2 - 4AC}}{2A}$$

Figure 3:
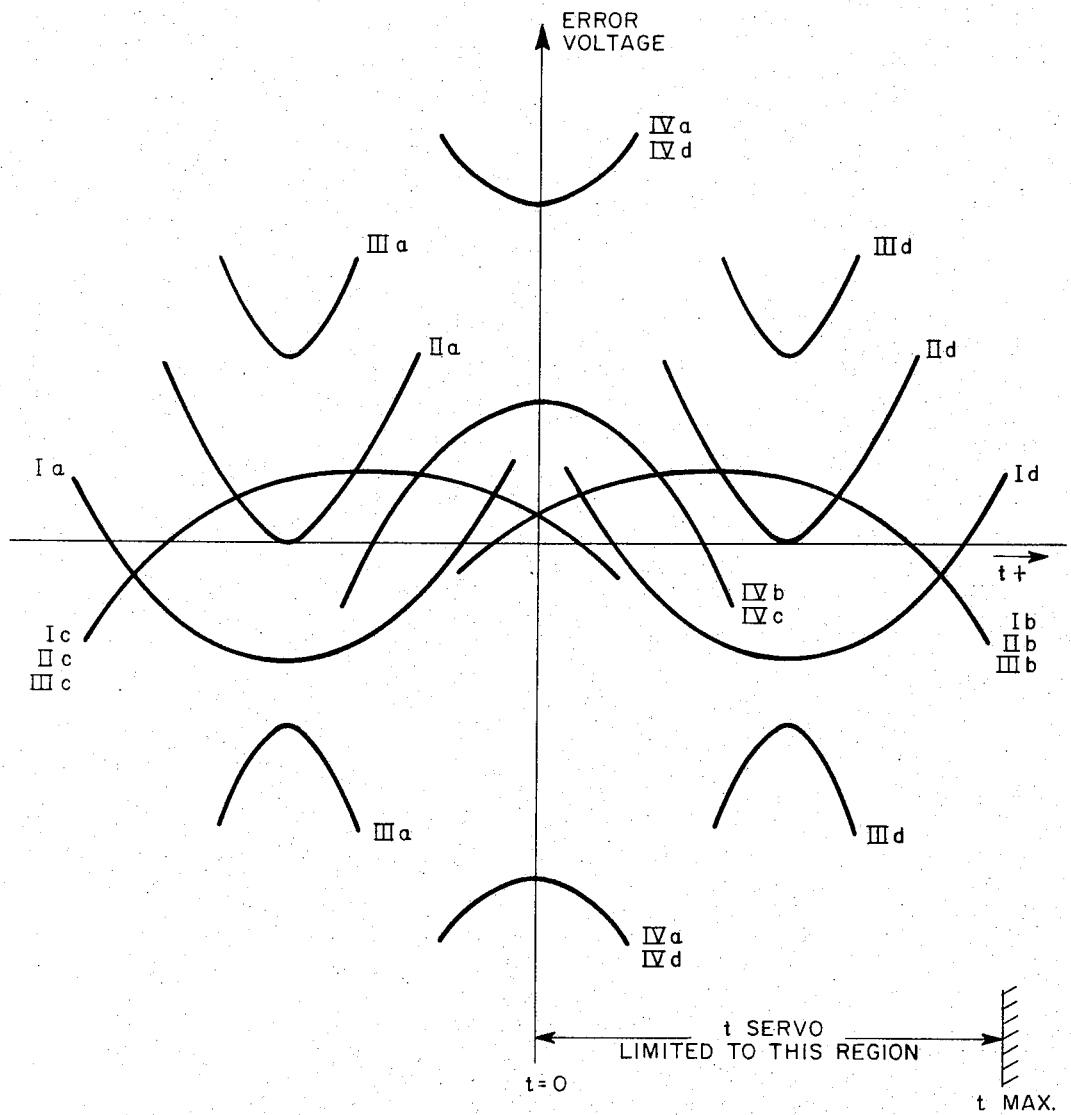
FIG. 3 is a graph of curves used to explain the system of the present invention.

Because (1) $t$ is a quadratic, (2) A and B can be plus or minus, and (3) C is always plus, there are sixteen possible root pairs of $t$. The following table lists all of the possible roots of the time servo error signal and FIG. 3 is a plot of the voltage variation between the roots of each pair.

TABLE —POSSIBLE ROOTS OF $At^2 + Bt + C + 0$

| Case | | a +A, +B | b −A, +B | c −A, −B | d +A, −B |
|---|---|---|---|---|---|
| I | $B^2 > 4AC$ | Two neg. unequal real. | One pos. real, one neg. real (+root largest). | One pos. real, one neg. real (−root largest). | Two pos. unequal and real. |
| II | $B^2 = 4AC$ | Two neg. real equal. | One pos, real, one neg. real (+root largest). | One pos, real, one neg. real (−root largest). | Two pos. real equal |
| III | $B^2 < 4AC$ | Two complex with neg. real parts. | One pos. real, one neg. real (+root largest). | One pos. real, one neg. real (−root largest). | Two complex with pos. real parts. |
| IV | $B = 0$ | Two equal and opp. imaginary. | Two equal and opp. real. | Two equal and opposite real. | Two equal and opposite imaginary. |

By phasing the time servo so that a positive error signal voltage drives the movable arm of the potentiometer 63 in a direction of increasing values of $t$ and a negative error signal voltage drives the movable arm of the potentiometer 63 in a direction of decreasing values of $t$, the servo will have a stable null point only where the slope of the error signal versus $t$ is negative. Thus, as can be seen from FIG. 3, the $t$ servo will always drive to the proper solution for cases 1b, 2b, 3b, 4b, 1c, 2c, 3c and 4c of the table. Cases 3a, 4a, 3d and 4d involve imaginary time and it will be impossible to introduce input quantities to produce these roots. In cases 1a and 2a, both the solutions are negative time and a positive error signal will drive the movable arm of the resolver 63 to $t$ max.

In case 1d the $t$ servo will always solve for the minimum time unless the past history places the movable arm of the potentiometer 63 at a position representing a time greater than the higher one of the two roots, and the value of this higher root is less than 10 arc-minutes. In such a case the servo will drive the movable arm of the potentiometer to $t$ max. and remain there until the input conditions change in such a way that the high value root exceeds $t$ max. or the conditions change to one of the other cases. In case 2b, the $t$ servo will drive the movable arm of the potentiometer 63 to $t$ max. Since this case is very special, it is very unlikely that the input conditions to produce this case would persist for a sufficient length of time to give false information to the operator. Accordingly, in substantially all cases the system will solve for the angle $\beta$ which will provide interception in the minimum time $t$.

In the preferred embodiment of the invention, the signal applied to the amplifier 53 is generated by adding together a signal representing $\dot{y} \sin \beta - \dot{x} \cos \beta)t$ and a signal representing $\Delta y \sin \beta - \Delta x \cos \beta$. The signal applied to the amplifier 67 is obtained by adding together a signal representing $(\dot{x} \sin \beta - \dot{x} \cos \beta)t$ with a signal representing $\Delta x \sin \beta + \Delta y \cos \beta$ and subtracting from it a signal representing $V_i t$. By obtaining the signals in this manner, the input signals can be maintained isolated from each other and can contain ground as a reference. Alternatively, signals representing the quantity $\Delta x + \dot{x}t$ and $\Delta y + \dot{y}t$ could be obtained by adding the input signals together and then only one resolver would be needed. These and many other modifications may be made to the above described specific embodiment of the invention without departing from the spirit and scope of the invention, which is defined in the appended claims.

What is claimed is:

1. A heading computer comprising means to generate a first output signal representing the quantity $\dot{y}t \sin \beta - \dot{x}t \cos \beta + \Delta y \sin \beta - \Delta x \cos \beta$ and a second output signal representing $\dot{x}t \sin \beta + \dot{y}t \cos \beta + \Delta x \sin \beta + \Delta y \cos \beta - V_i t$ in which $\beta$ is a first parameter and $t$ is a second parameter and wherein $\dot{x}$ and $\dot{y}$ are derivatives of $x$ and $y$ with respect to $t$ respectively, a variable gain amplifier having a gain varying inversely in accordance with said second parameter $t$ connected to amplify said first output signal, means responsive to said first output signal amplified by said amplifier to change said first parameter $\beta$ until said first output signal becomes zero, and means responsive to said second output signal to change said second parameter $t$ until said second output signal becomes zero.

2. A heading computer comprising means to generate a first output signal representing the quantity $\dot{y}t \sin \beta - \dot{x}t \cos \beta + \Delta y \sin \beta - \Delta x \cos \beta$ and a second output signal representing the quantity $\dot{x}t \sin \beta + \dot{y}t \cos \beta + \Delta x \sin \beta + \Delta y \cos \beta - V_i t$ in which $\beta$ is a first parameter and $t$ is a second parameter and wherein $\dot{x}$ and $\dot{y}$ are derivatives of $x$ and $y$ with respect to $t$ respectively, means responsive to said first output signal to change said first parameter $\beta$ until said first output signal becomes zero, means responsive to said second output signal to change said second parameter $t$ until said second output signal becomes zero.

3. A heading computer as recited in claim 2 wherein said signal generating means is operable in response to applied input signals representing variable quantities $\dot{x}$, $\dot{y}$, $\Delta x$, $\Delta y$ and $V_i$ to vary said first and second output signals in accordance with said input signals.

4. A heading computer comprising means responsive to input signals representing the variable quantities $\dot{x}$, $\dot{y}$, $\Delta x$, $\Delta y$ and $V_i$ to generate a first output signal representing $\dot{y}t \sin \beta - \dot{x}t \cos \beta + \Delta y \sin \beta - \Delta x \cos \beta$ and a second output signal representing the quantity $\dot{x}t \sin \beta + \dot{y}t \cos \beta + \Delta x \sin \beta + \Delta y \cos \beta - V_i t$ in which $\beta$ is a first parameter and $t$ is a second parameter and wherein $\dot{x}$ and $\dot{y}$ are derivatives of $x$ and $y$ with respect to $t$ respectively, a first variable gain amplifier having a gain varying inversely with the quantity $V_i t$ connected to amplify said first output signal, a second variable gain amplifier having a gain varying inversely in accordance with the quantity $V_i$ connected to amplify said second output signal, means responsive to the output signal of said first amplifier to change said first parameter $\beta$ until said first output signal becomes zero, means responsive to the output signal of said second amplifier to change said second parameter $t$ until said second output signal becomes zero.

5. A heading computer comprising first and second resolvers having their input shafts coupled together in the same angular position and each having two inputs and two outputs and operable to produce from the first output a signal representing the signal applied to its first input times the sine of its input shaft angle minus the signal applied to its second input times the cosine of its input shaft angle and a signal from its second output representing the signal applied to its first input times the cosine of said input shaft angle plus the signal applied to its second input times the sine of its input shaft angle, input means to receive an input signal, multiplying means to multiply the signal produced at the first output of said first resolver times a parameter to produce a first output signal, to multiply the signal produced at the second output of said first resolver times said parameter to produce a second output signal and to multiply the signal received by said input means times said parameter to produce a third output signal, means responsive to the sum of the first output signal of said multiplying means plus the signal produced at the first output of said second resolver to drive the input shafts of said resolvers until such sum becomes zero, and means responsive to the sum of the second output signal of said multiplying means plus the signal produced at the second output of said second resolver minus the third output signal of said multiplying means to change said parameter until such sum becomes zero.

6. A simultaneous equation computer comprising means to generate a first signal varying in accordance with a first function of first and second parameters and to generate a second signal varying in accordance with a second function of first and second parameters, means responsive to said first signal to change said first parameter until said first signal becomes zero, and means responsive to said second signal to change said second parameter until said second signal becomes zero.

References Cited

UNITED STATES PATENTS 2,455,974  12/1948  Brown _____ 235—180
3,233,086  2/1966  Schwetman _____ 235—180

MALCOLM A. MORRISON, *Primary Examiner.*

A. J. SARLI, J. F. RUGGIERO, *Assistant Examiners.*